United States Patent
Lawrence et al.

(10) Patent No.: US 10,772,458 B2
(45) Date of Patent: Sep. 15, 2020

(54) ROLLABLE BEVERAGE BREWING ASSEMBLY

(71) Applicants: Willie Lawrence, New Havens, CT (US); Randy Aiken, New Haven, CT (US)

(72) Inventors: Willie Lawrence, New Havens, CT (US); Randy Aiken, New Haven, CT (US)

(*) Notice: Subject to any disclaimer, the term of this patent is extended or adjusted under 35 U.S.C. 154(b) by 254 days.

(21) Appl. No.: 16/044,627

(22) Filed: Jul. 25, 2018

(65) Prior Publication Data

US 2020/0029727 A1    Jan. 30, 2020

(51) Int. Cl.
| | | |
|---|---|---|
| *A47J 31/00* | (2006.01) | |
| *A47J 31/44* | (2006.01) | |
| *A47J 31/10* | (2006.01) | |
| *A47J 31/04* | (2006.01) | |
| *A47J 31/24* | (2006.01) | |

(52) U.S. Cl.
CPC .......... *A47J 31/4403* (2013.01); *A47J 31/00* (2013.01); *A47J 31/005* (2013.01); *A47J 31/04* (2013.01); *A47J 31/10* (2013.01); *A47J 31/24* (2013.01)

(58) Field of Classification Search
CPC ........ A47J 31/002; A47J 31/005; A47J 31/00; A47J 31/04; A47J 31/10; A47J 31/24
USPC .................................. 99/307, 306, 290, 284
See application file for complete search history.

(56) References Cited

U.S. PATENT DOCUMENTS

| | | | |
|---|---|---|---|
| 4,076,349 A * | 2/1978 | Gettleman | A47B 31/02 312/236 |
| 4,382,402 A | 5/1983 | Alvarez | |
| 4,674,400 A | 6/1987 | Rondel | |
| D389,694 S | 1/1998 | Vinson | |
| 6,240,830 B1 * | 6/2001 | Goldston | A47J 31/44 99/279 |
| 6,470,793 B1 * | 10/2002 | Vogt | A47J 31/4403 99/279 |
| 8,978,542 B2 | 3/2015 | Talon | |
| 9,182,111 B2 | 11/2015 | Chien | |
| 2010/0062128 A1 * | 3/2010 | Khoo | A23F 5/465 426/474 |
| 2010/0145522 A1 * | 6/2010 | Claesson | B67D 1/0051 700/265 |
| 2015/0257586 A1 | 9/2015 | DiNucci | |
| 2016/0367072 A1 | 12/2016 | Boone | |
| 2017/0035239 A1 | 2/2017 | Jagne | |
| 2017/0360243 A1 * | 12/2017 | Crowne | A47J 31/41 |

FOREIGN PATENT DOCUMENTS

WO    WO2015138299    9/2015

* cited by examiner

*Primary Examiner* — Reginald Alexander

(57) ABSTRACT

A rollable beverage brewing assembly for brewing hot beverages at any location and charging electronic devices includes a housing, a control circuit being coupled to the housing and a plurality of rollers that are each rotatably coupled to the housing for rolling along a support surface. A handle is slidably coupled to the housing for rolling the housing on the rollers for transporting the housing. A brewer is positioned in the housing for brewing a hot beverage such as coffee or tea and the brewer is electrically coupled to the control circuit. A charging unit is coupled to the housing and a plurality of electronic devices may be electrically coupled thereto for charging the electronic devices.

6 Claims, 5 Drawing Sheets

ROLLABLE BEVERAGE BREWING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to brewing devices and more particularly pertains to a new brewing device for brewing hot beverages at any location and charging electronic devices.

BRIEF SUMMARY OF THE INVENTION

An embodiment of the disclosure meets the needs presented above by generally comprising a housing, a control circuit being coupled to the housing and a plurality of rollers that are each rotatably coupled to the housing for rolling along a support surface. a handle is slidably coupled to the housing for rolling the housing on the rollers for transporting the housing. A brewer is positioned in the housing for brewing a hot beverage such as coffee or tea and the brewer is electrically coupled to the control circuit. A charging unit is coupled to the housing and a plurality of electronic devices may be electrically coupled thereto for charging the electronic devices.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
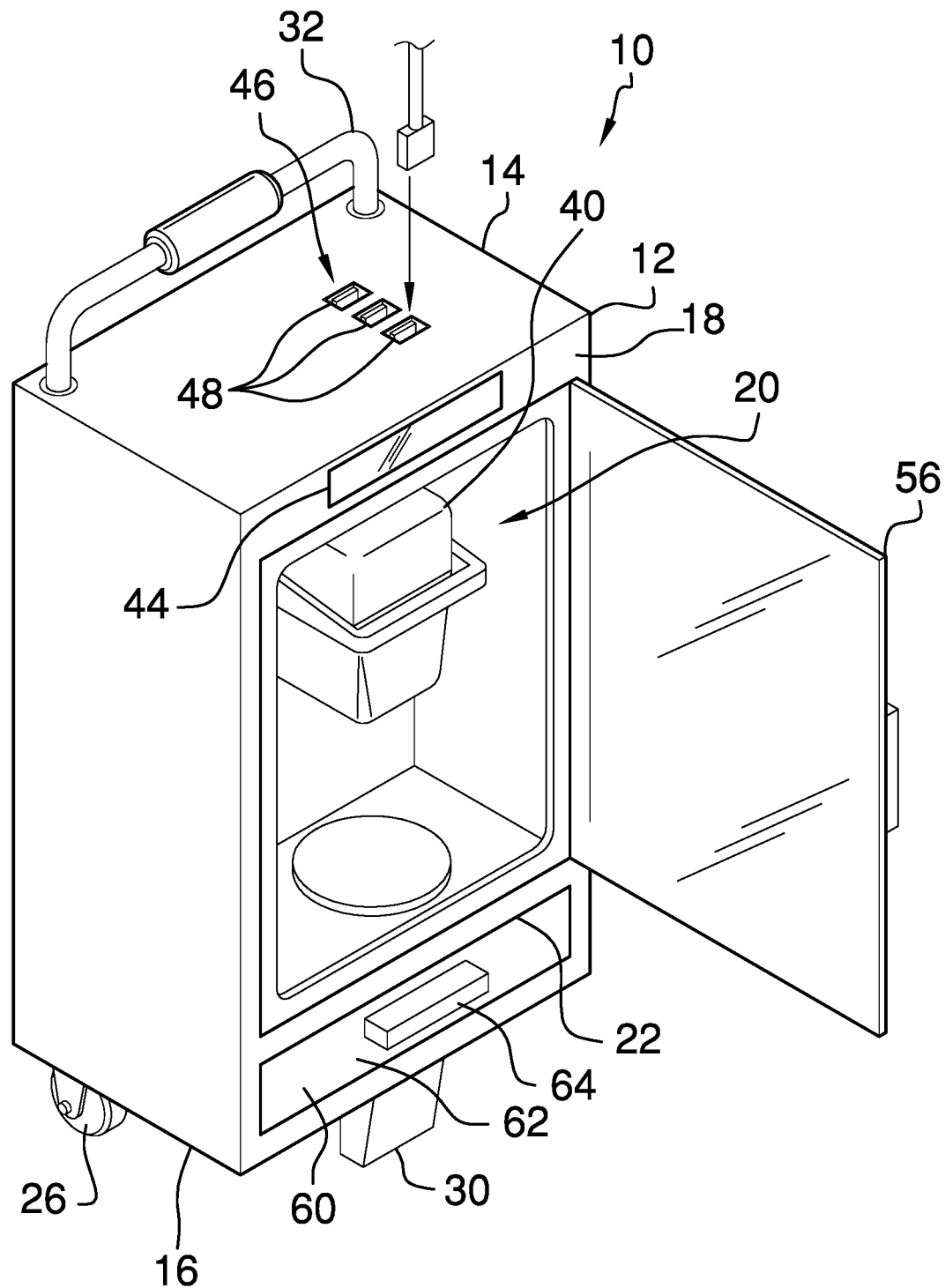
FIG. 1 is a front perspective view of a rollable beverage brewing assembly according to an embodiment of the disclosure.
Figure 2:
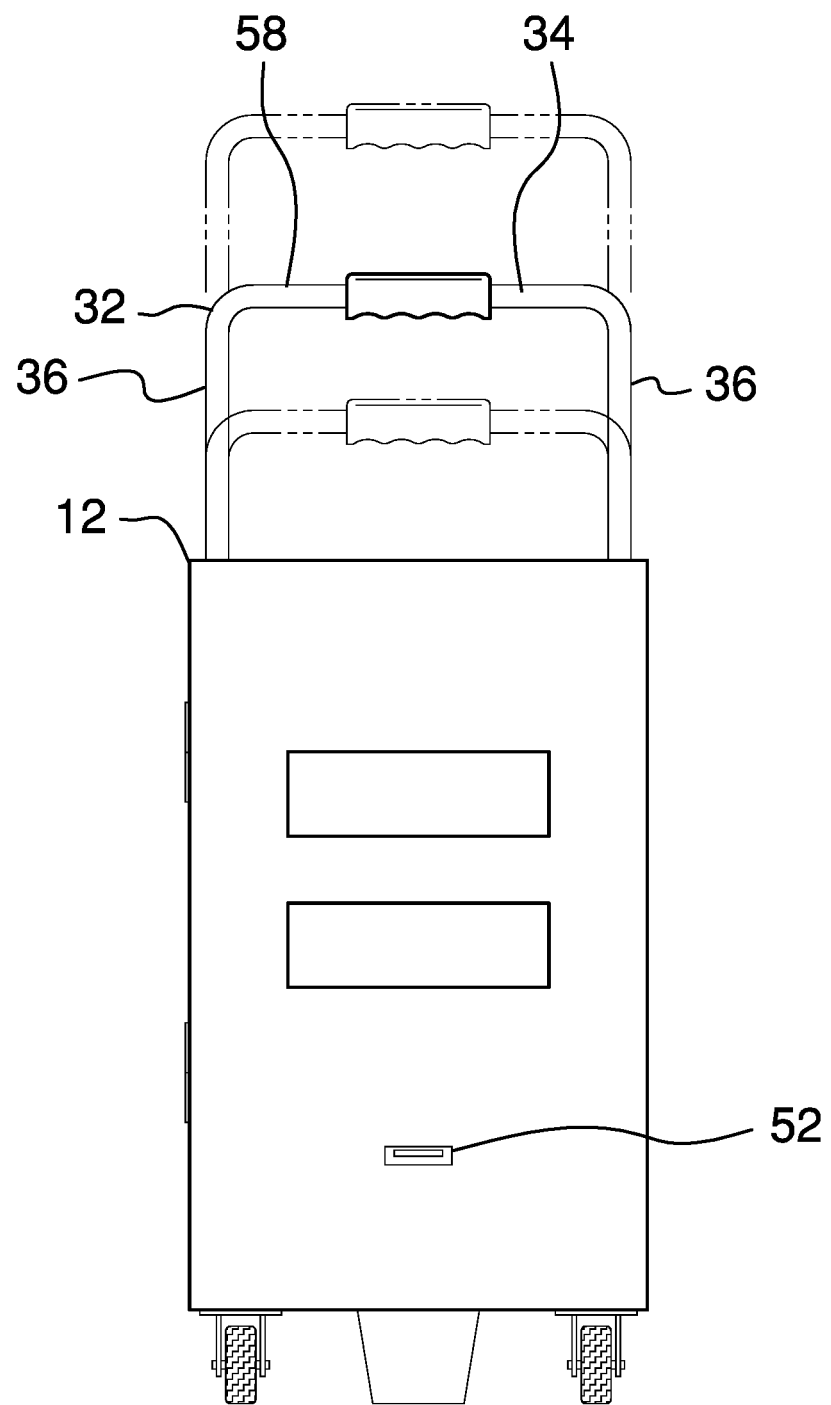
FIG. 2 is a back view of an embodiment of the disclosure.
Figure 3:
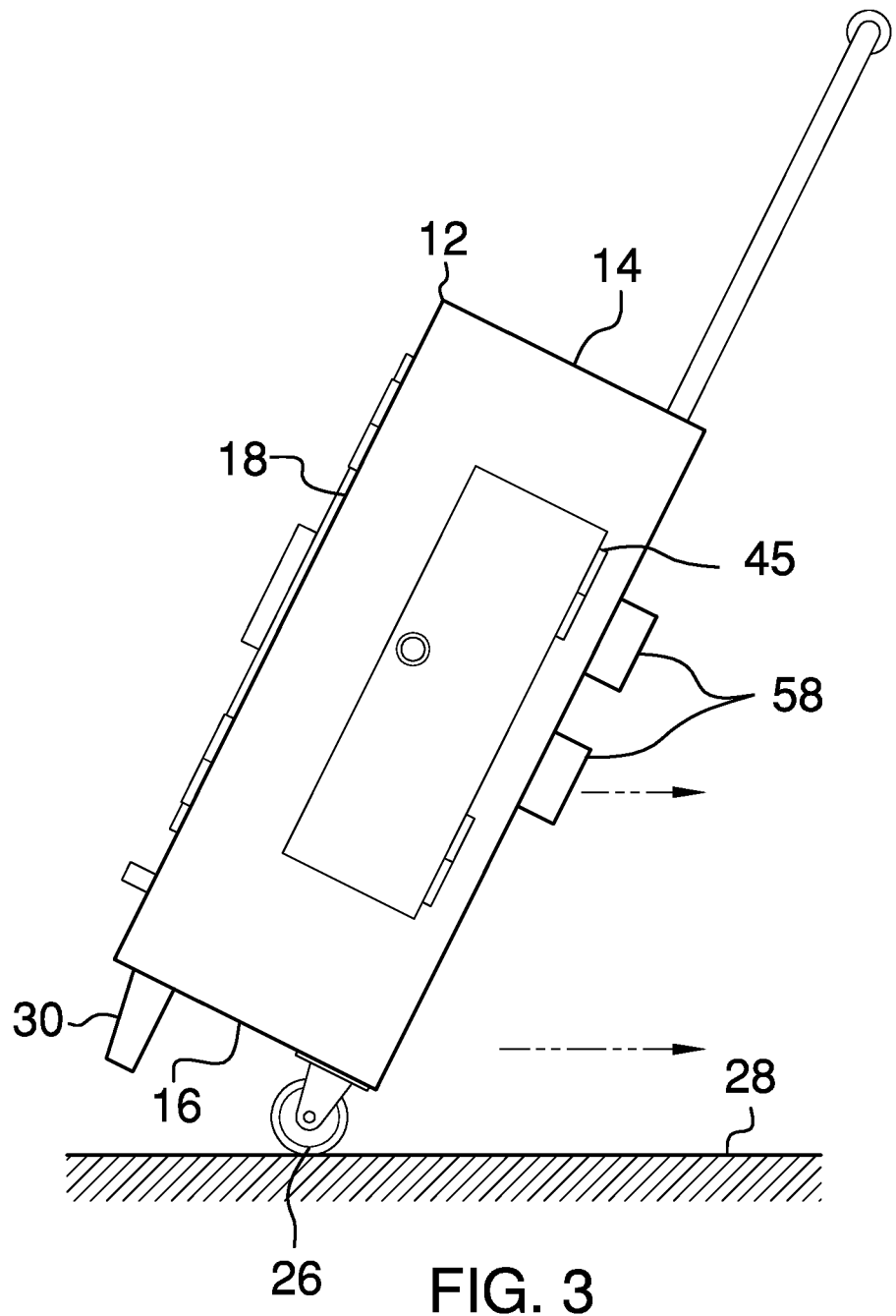
FIG. 3 is a perspective in-use view of an embodiment of the disclosure being rolled along a support surface.
Figure 4:
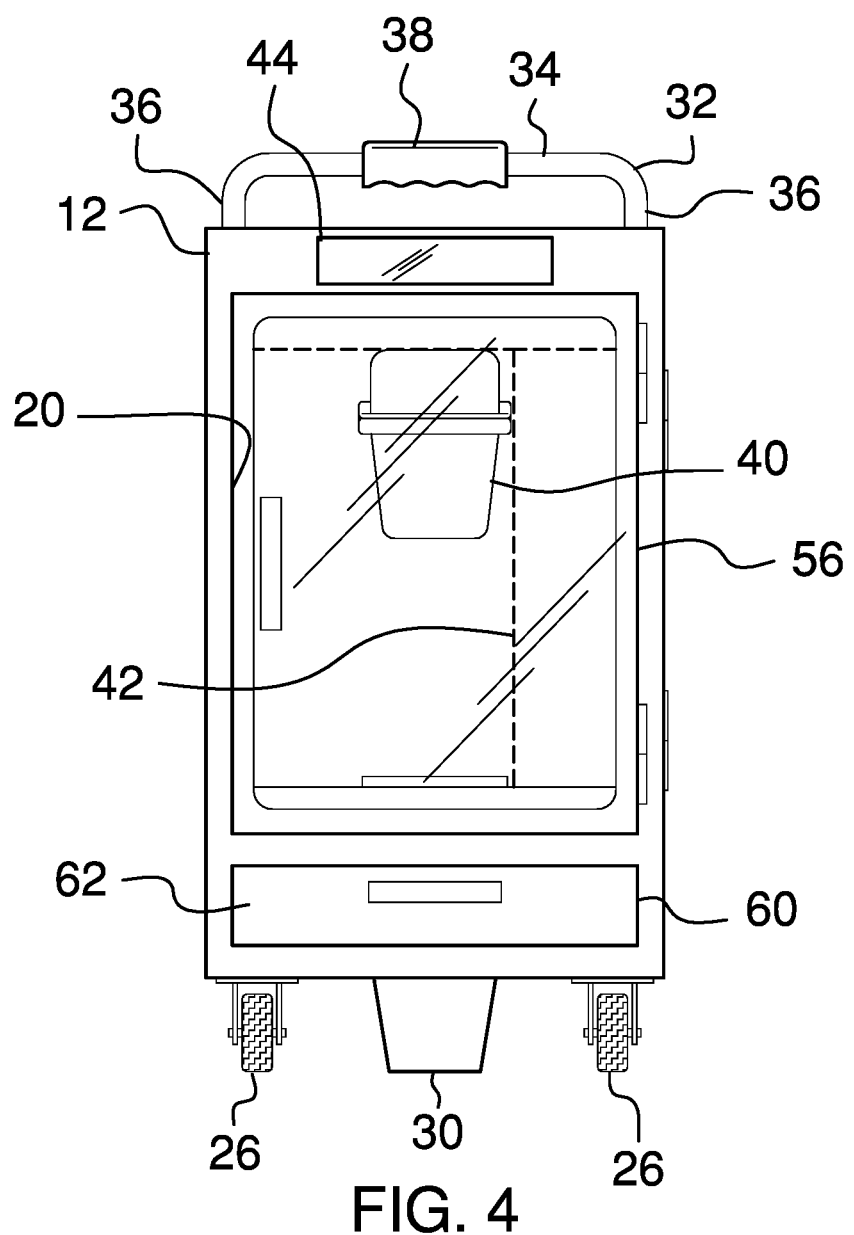
FIG. 4 is a front phantom view of an embodiment of the disclosure.
Figure 5:
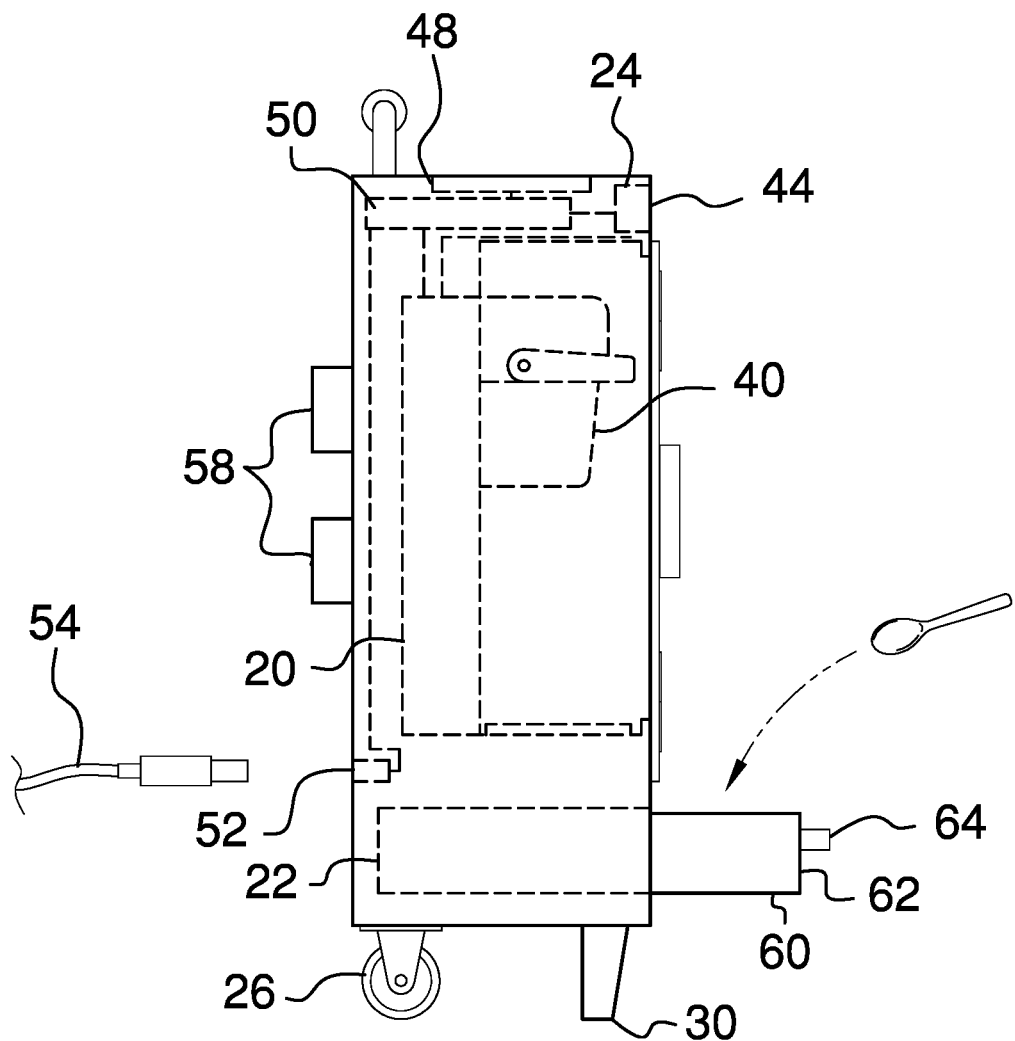
FIG. 5 is a right side phantom view of an embodiment of the disclosure.

With reference now to the drawings, and in particular to FIGS. 1 through 5 thereof, a new brewing device embodying the principles and concepts of an embodiment of the disclosure and generally designated by the reference numeral 10 will be described.

As best illustrated in FIGS. 1 through 5, the rollable beverage brewing assembly 10 generally comprises a housing 12 that has a top wall 14, a bottom wall 16, a front side 18; the housing 12 is hollow, the front side 18 has a first opening 20 extending into an interior of the housing 12 and the front side 18 has a second opening 22 extending into the interior of the housing 12. A control circuit 24 is coupled to the housing 12 and a plurality of rollers 26 is each rotatably coupled to the housing 12 for rolling along a support surface 28. Each of the rollers 26 is positioned on the bottom wall 16 and a foot 30 is coupled to the bottom wall 16 of the housing 12. The foot 30 supports the housing 12 in an upright position on the support surface 28 when the housing 12 is stationary.

A handle 32 is slidably coupled to the housing 12 for rolling the housing 12 on the rollers 26 for transporting the housing 12. The handle 32 comprises a central member 34 extending between a pair of end members 36. Each of the end members 36 is slidably coupled to the top wall 14 of the housing 12 such that the central member 34 is urgeable away from the top wall 14 for gripping the central member 34. A cushion 38 is positioned around the central member 34 for enhancing gripping the central member 34 and the cushion 38 is centrally positioned between the end members 36.

A brewer 40 is positioned in the housing 12 for brewing a hot beverage such as coffee or tea. The brewer 40 is electrically coupled to the control circuit 24 and the brewer 40 may be an electric basket type brewer 40 of any conventional design. A reservoir 42 is positioned within the housing 12 for containing water and the reservoir 42 is fluidly coupled to the brewer 40 for supply water for brewing the hot beverage. A touch screen 44 is coupled to the housing 12 and the touch screen 44 is electrically coupled to the control circuit 24. The touch screen 44 controls operational parameters of the brewer 40 and the touch screen 44 displays indicia comprising the operational parameters of the brewer 40. An access panel 45 is hingedly coupled to the housing 12 for accessing the reservoir 42.

A charging unit 46 is coupled to the housing 12 and a plurality of electronic devices can be electrically coupled to the charging unit 46 for charging the electronic devices. The electronic devices may be smart phones, laptop computers and any other type of rechargeable electronic device. The charging unit 46 comprises a plurality of output charge ports 48 that is each recessed into the top wall 14 of the housing 12. Each of the output charge ports 48 has a respective one of the electronic devices electrically coupled thereto for charging. Each of the output charge ports 48 may comprise a usb port or the like.

At least one battery 50 is positioned within the housing 12 and each of the output charge ports 48 is electrically coupled to the at least one battery 50 for charging the electronic devices. An input charge port 52 is coupled to the housing 12 and the input charge port 52 is electrically coupled to the at least one battery 50. The input charge port 52 is electrically coupled to a power source 54 for recharging the at least one battery 50. The input charge port 52 may comprise a usb port or the like and the power source 54 may be a battery 50 charger or the like.

A door 56 is hingedly coupled to the front side 18 of the housing 12, the door 56 is aligned with the first opening 20 and the door 56 closes the first opening 20 when the door 56 is closed. The door 56 exposes the first opening 20 when the door 56 is opened and the door 56 is comprised of a translucent material. A pair of compartments 58 is each coupled to the housing 12 for storing accessories for brewing the hot beverage. A drawer 60 is slidably coupled to the housing 12 for storing accessories for brewing the hot beverage and the drawer 60 is positioned in the second opening 22 in the front side 18 of the housing 12. The drawer 60 has a forward wall 62, the forward wall 62 is aligned with the front side 18 when the drawer 60 is closed and a grip 64 is coupled to the forward wall 62 of the drawer 60 for gripping.

In use, the handle 32 is gripped, the housing 12 is tipped onto the rollers 26 and the housing 12 is rolled to a selected destination. In this way the hot beverage can be brewed at any time, and at any location, such as a sporting event or other gathering. The reservoir 42 is filled with water and the brewer 40 is employed in the conventional manner of coffee makers to brew coffee, tea or other hot beverage. Additionally, an electronic device can be charged with the charging unit 46 thereby facilitating the electronic device to be recharged at any time and at the selected destination.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A rollable beverage brewing assembly being configured to brew coffee or tea, said assembly comprising:
   a housing;
   a control circuit being coupled to said housing;
   a plurality of rollers, each of said rollers being rotatably coupled to said housing for rolling along a support surface;
   a handle being slidably coupled to said housing for rolling said housing on said rollers for transporting said housing;
   a brewer being positioned in said housing for brewing a hot beverage such as coffee or tea, said brewer being electrically coupled to said control circuit;
   a reservoir being positioned within said housing for containing water, said reservoir being fluidly coupled to said brewer for supply water for brewing the hot beverage; and
   a charging unit being coupled to said housing, said charging unit having a plurality of electronic devices being electrically coupled thereto for charging the electronic devices.

2. The assembly according to claim 1, wherein:
   said housing has a top wall, a bottom wall and a front side, housing being hollow, said front side having a first opening extending into an interior of said housing, said front side having a second opening extending into said interior of said housing;
   each of said rollers is positioned on said bottom wall;
   a foot is coupled to said bottom wall of said housing, said foot supporting said housing in an upright position on the support surface when said housing is stationary; and
   said handle comprises a central member extending between a pair of end members, each of said end members being slidably coupled to said top wall of said housing such that said central member is urgeable away from said top wall for gripping said central member.

3. The assembly according to claim 2, wherein said charging unit comprises:
   a plurality of output charge ports, each of said output charge ports being recessed into said top wall of said housing, each of said output charge ports having a respective one of the electronic devices being electrically coupled thereto;
   at least one battery being positioned within said housing, each of said output charge ports being electrically coupled to said at least one battery for charging the electronic devices; and
   an input charge port being coupled to said housing, said input charge port being electrically coupled to said at least one battery, said input charge port being electrically coupled to a power source for recharging said at least one battery.

4. The assembly according to claim 1, further comprising a touch screen being coupled to said housing, said touch screen being electrically coupled to said control circuit, said touch screen controlling operational parameters of said brewer, said touch screen displaying indicia comprising the operational parameters of said brewer.

5. The assembly according to claim 2, further comprising:
   a pair of compartments, each of said compartments being coupled to said housing for storing accessories for brewing the hot beverage;

a drawer being slidably coupled to said housing for storing accessories for brewing the hot beverage, said drawer being positioned in said second opening in said front side of said housing, said drawer having a forward wall, said forward wall being aligned with said front side when said drawer is closed; and a grip being coupled to said forward wall of said drawer for gripping.

6. A rollable beverage brewing assembly being configured to brew coffee or tea, said assembly comprising:

a housing having a top wall, a bottom wall and a front side, housing being hollow, said front side having a first opening extending into an interior of said housing, said front side having a second opening extending into said interior of said housing;

a control circuit being coupled to said housing;

a plurality of rollers, each of said rollers being rotatably coupled to said housing for rolling along a support surface, each of said rollers being positioned on said bottom wall;

a foot being coupled to said bottom wall of said housing, said foot supporting said housing in an upright position on the support surface when said housing is stationary;

a handle being slidably coupled to said housing for rolling said housing on said rollers for transporting said housing, said handle comprising a central member extending between a pair of end members, each of said end members being slidably coupled to said top wall of said housing such that said central member is urgeable away from said top wall for gripping said central member;

a brewer being positioned in said housing for brewing a hot beverage such as coffee or tea, said brewer being electrically coupled to said control circuit;

a reservoir being positioned within said housing for containing water, said reservoir being fluidly coupled to said brewer for supply water for brewing the hot beverage;

a charging unit being coupled to said housing, said charging unit having a plurality of electronic devices being electrically coupled thereto for charging the electronic devices, said charging unit comprising:

a plurality of output charge ports, each of said output charge ports being recessed into said top wall of said housing, each of said output charge ports having a respective one of the electronic devices being electrically coupled thereto;

at least one battery being positioned within said housing, each of said output charge ports being electrically coupled to said at least one battery for charging the electronic devices; and an input charge port being coupled to said housing, said input charge port being electrically coupled to said at least one battery, said input charge port being electrically coupled to a power source for recharging said at least one battery;

a door being hingedly coupled to said front side of said housing, said door being aligned with said first opening, said door closing said first opening when said door is closed, said door exposing said first opening when said door is opened, said door being comprised of a translucent material;

a touch screen being coupled to said housing, said touch screen being electrically coupled to said control circuit, said touch screen controlling operational parameters of said brewer, said touch screen displaying indicia comprising the operational parameters of said brewer;

a pair of compartments, each of said compartments being coupled to said housing for storing accessories for brewing the hot beverage;

a drawer being slidably coupled to said housing for storing accessories for brewing the hot beverage, said drawer being positioned in said second opening in said front side of said housing, said drawer having a forward wall, said forward wall being aligned with said front side when said drawer is closed; and a grip being coupled to said forward wall of said drawer for gripping.

* * * * *